US006574409B1

(12) United States Patent
Moroni et al.

(10) Patent No.: US 6,574,409 B1
(45) Date of Patent: Jun. 3, 2003

(54) ATHERMALIZED WAVELENGTH DIVISION MULTIPLEXER/DEMULTIPLEXER WITH POLYMER COMPENSATION REGION AND METHODS OF MANUFACTURING

(75) Inventors: Marc Moroni, Melun (FR); Sophie Vallon, St Michel sur Orge (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/660,638

(22) Filed: Sep. 13, 2000

(30) Foreign Application Priority Data

Sep. 28, 1999 (EP) ............................................. 99402364

(51) Int. Cl.$^7$ ................................................. G02B 6/10
(52) U.S. Cl. ......................... 385/129; 385/132; 385/122
(58) Field of Search ................................. 385/129, 132, 385/46, 122, 143, 15, 14

(56) References Cited

U.S. PATENT DOCUMENTS

| 5,136,671 A | * | 8/1992 | Dragone ...................... 385/17 |
| 5,799,118 A | | 8/1998 | Ogusu et al. .................. 385/14 |
| 6,084,050 A | * | 7/2000 | Ooba et al. .................... 528/42 |
| 6,118,909 A | | 9/2000 | Chen et al. .................... 385/15 |
| 6,137,939 A | | 10/2000 | Henry et al. ................. 385/132 |
| 6,181,848 B1 | | 1/2001 | Bruno et al. | |

FOREIGN PATENT DOCUMENTS

| CA | 2291405 | 10/2000 |
| EP | 0907091 A | 4/1999 |
| EP | 0919840 A | 6/1999 |
| JP | 10-273615 | 10/1998 |

OTHER PUBLICATIONS

Bouadma, N. et al., "Integration of a Laser Diode With a Polymer–Based Waveguide for Photonic Integrated Circuits," *IEE Photonics Technology Letters*, vol. 6, No. 10, Oct. 1994, pp. 1188–1190.

Pitois, C. et al., "Low–Loss Passive Optical Waveguides Based on Photosensitive Poly(pentafluorostyrene–co–glycidyl methacrylate)," ©*1999 American Chemical Society, Macromolecules*, vol. 32, No. 9, 1999, pp. 2903–2909.

Inoue Y. et al. , "Athermal Silica–Based Arrayed–Waveguide Grating (AWG) Multiplexer", IOOC–ECOC, European Conference on Optical Communication, ECOC. International Conference on Integrated Optics And Optical Fibre Communication IOOC, Sep. 22, 1997, XP002058688, 5 pages.

* cited by examiner

*Primary Examiner*—Ellen E. Kim
(74) *Attorney, Agent, or Firm*—Price, Heneveld, Cooper, DeWitt & Litton (57) ABSTRACT

An athermalized optical waveguide circuit device exhibiting reduced signal power losses includes an optical phased-array comprising a plurality of curved waveguide cores of different lengths supported on a planar substrate, wherein each of the waveguide cores of the array includes a first silica segment, a second silica segment, and a central polymer segment connecting the first silica segment with the second silica segment to form a continuous waveguide core. The device is prepared by forming a plurality of adjacent curved silica waveguide cores on a planar substrate, overcladding the silica waveguide cores with a silica overclad, etching at least one groove into a central portion of the optical phased-array through the overclad and silica waveguide cores, forming a plurality of polymer waveguide core segments connecting a first silica waveguide core segment with a corresponding second silica waveguide core segment to form a continuous waveguide core, and overcladding the polymer waveguide core segments to define a composite optical phased-array comprising a plurality of adjacent composite waveguides. The polymer waveguide core segments have a negative variation of index of refraction as a function of temperature to compensate for the positive variation of the silica waveguide core segments, while providing an uninterrupted waveguide with low power loss of optical signals.

35 Claims, 3 Drawing Sheets

ATHERMALIZED WAVELENGTH DIVISION MULTIPLEXER/DEMULTIPLEXER WITH POLYMER COMPENSATION REGION AND METHODS OF MANUFACTURING

CROSS-REFERENCED TO A RELATED APPLICATION

Priority is claimed under 35 U.S.C.§119 from European Patent Application No. 99402364.6, filed Sep. 28, 1999.

BACKGROUND OF THE INVENTION

1. Field of the Invention

The present invention relates generally to a wavelength division multiplexer and demultiplexer for use in the field of optical communication and optical information processing, and more particularly to an athermalized wavelength division multiplexer and demultiplexer and method of manufacturing.

2. Technical Background

Computer and communication systems place an ever-increasing demand upon communication link bandwidths. It is generally known that optical fibers offer a much higher bandwidth than conventional coaxial links. Further, a single optical channel in a fiber waveguide uses a small fraction of the available bandwidth of the fiber. In wavelength division multiplexed (WDM) optical communication systems, multiple optical wavelength carriers transmit independent communication channels along a single optical fiber. By transmitting several channels at different wavelengths into one fiber, the bandwidth capability of an optical fiber is efficiently utilized.

Fiber-optic multiplexing and demultiplexing have been accomplished for nearly a decade using a plurality of closely spaced waveguides communicating with an input coupler. The output of the coupler communicates with a second coupler via an optical grating consisting of an array of optical waveguides each of which differing in length with respect to its nearest neighbor by a predetermined fixed amount. The outputs of the second coupler form the outputs of the multiplexing and demultiplexing device. In operation, when a plurality of separate and distinct wavelengths are applied to separate and distinct input ports of the device, they are combined and are transmitted to an output port. The same device may also perform a demultiplexing function in which a plurality of input wavelengths are directed to a predetermined one of the input ports of the apparatus, and each of the input wavelengths is separated from the other and directed to predetermined ones of the output ports.

The grating located between the couplers consists of a plurality of waveguides of different lengths ordered in an array. Wavelength division multiplexers and demultiplexers require precise control of the optical path difference between adjacent waveguides. The optical path difference is the product of the effective index of refraction of the fundamental mode in the waveguide and the physical path difference between adjacent waveguides. The effective index of refraction of the fundamental mode in the waveguides and the physical path differences between adjacent waveguides for currently available wavelength division multiplexers and demultiplexers are typically both temperature dependent. In conventional integrated optical multiplexer and demultiplexer devices, the medium forming the arrayed waveguides has a noticeable temperature dependency which results in changes in the central transmission wavelength which may exceed the transmission bandwidth. As a result, temperature variations in the usually operating temperature range (from about 0° C. to about 70° C.) induce a wavelength shift which is unacceptable in comparison to the typical accuracy requirements (about 0.1 nm) in center channel position. Consequently, available multiplexer/demultiplexer optical devices of the phased-array type are generally operated in a temperature controlled environment. Typically, control circuits with heating elements are provided to insure a stable temperature environment. However, the use of heating elements to achieve active athermalization is undesirable because it increases the overall cost, size and complexity of the device, and may consume considerable power.

In the case of conventional wavelength division multiplexers having a phased-array optical grating comprised of a plurality of silica waveguides and silica cladding, the variation of channel wavelength as a function of temperature predominately depends on the positive variation of the effective index of refraction of the waveguides as a function of temperature. In an effort to compensate for the positive variation of refractive index as a function of temperature for silica-based materials, polymer overcladding materials having a negative variation of refractive index as a function of temperature have been employed. However, a problem with this arrangement is that as the temperature varies, the difference in refractive index between the core and the cladding varies, and in the worst case, light may not be able to be guided into the waveguide. As a result, optical multiplexer/demultiplexer devices having a phased-array type grating with a polymer overcladding may not be suitable for use over a wide range of ambient temperatures. Another problem with this optical fiber structure is that the polymer overcladding makes it more difficult to connect optical fibers to the input ports of the device.

Another proposed design for maintaining a relatively constant optical path difference between adjacent waveguides in a phased-array involves localizing a polymer in a triangular groove in the phased-array. The groove is etched in the center of the phased-array to the bottom of the waveguides and is filled with a polymer, typically a silicone polymer. The ratio of the optical path difference between adjacent waveguides in the silica region to the optical path difference in the groove can be selected to cancel, or at least minimize, the variation in the mean channel wavelength as a function of temperature. An advantage of the groove design as compared with the overclad design is that the polymer is localized in the middle of the device. This avoids the problem associated with connecting polymer overcladding optical fibers to a device. However, phased-array devices having a polymer filled triangular groove exhibit a loss of about 2 dB in excess of standard phased-array devices. The excess loss is believed to be attributable to free-space propagation of light into the groove. Light is guided into the input side of the waveguides of the phased-array, propagates freely in the groove, and is only partially collected by the output waveguides of the phased-array. The estimated excess loss for such a waveguide increases as a function of the path length in the groove which is not constant, but depends on the number of waveguides in the phased-array. Thus, the loss in the different waveguides is not constant and cross talk may result.

Therefore, there remains a need for optical multiplexer/demultiplexer devices of the phased-array type in which the optical path difference between adjacent waveguides in the phased-array region is more precisely controlled to minimize wavelength shifts to an acceptable level while also minimizing power loss in the transmitted signals without the use of active temperature control means, such as heating elements.

SUMMARY OF THE INVENTION

This invention is directed to a passively athermalized optical waveguide device which is useful for optical waveguide division multiplexing and/or demultiplexing, in which the positive variation of the effective index of refraction as a function of temperature in a waveguide having a silica core is compensated by a negative variation in effective index of refraction as a function of temperature in a polymer waveguide core, without unacceptable loss of optical signal power.

In accordance with an aspect of the invention, an optical waveguide device includes an optical phased-array comprising a plurality of curved waveguide cores of different lengths supported on a planar substrate in which each waveguide core includes a first silica segment, a second silica segment, and a central polymer segment connecting the first silica segment with the second silica segment to form a continuous waveguide core. The ratio of the optical path difference between each pair of adjacent waveguide cores in the silica segments to the optical path difference between the adjacent waveguide cores in the polymer segments is selected to minimize variation in the overall optical path difference of the waveguides. The polymer segments of the waveguide cores have a negative variation in effective index of refraction as a function of temperature to compensate for the positive variation in the index of refraction of the silica waveguide core segments as a function of temperature, thereby inhibiting shifting of channel wavelengths due to variations in operating temperature within a predetermined operating temperature range.

In another aspect of the invention, a method of making a passively athermalized optical waveguide device is provided. A planar substrate is provided, and a plurality of adjacent curved silica waveguide cores of different lengths are formed on the planar substrate. The silica waveguide cores are overcladded with a glass overclad to define an optical phased-array. At least one triangular groove is etched into a central portion of the optical phased-array through to the planar substrate to divide each waveguide core into a first silica waveguide core segment and a second silica waveguide core segment, in which the first and second silica waveguide core segments are separated by free space. A plurality of distinct polymer waveguide core segments are formed in the triangular groove, with each polymer waveguide core segment connecting a first silica waveguide core segment with a corresponding second silica waveguide core segment to form a continuous waveguide core. The polymer waveguide core segments may be overcladded to form an optical phased-array comprising a plurality of adjacent waveguides. The dimensions of the groove or grooves which define the optical path lengths of the polymer waveguide core segments, are selected so that the ratio of the optical path difference between each pair of adjacent waveguide cores in the silica segments to the optical path difference between the adjacent waveguide cores in the polymer segments minimizes variation in the overall optical path difference of the adjacent waveguide cores.

DETAILED DESCRIPTION OF THE PREFERRED EMBODIMENTS

Figure 1:
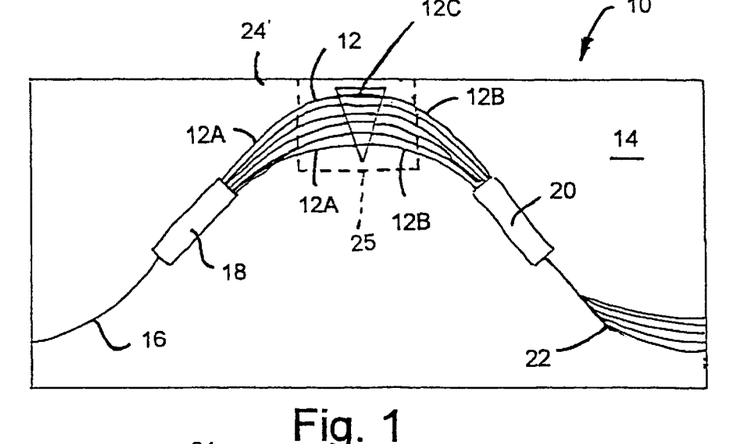
FIG. 1 is a schematic top view of a phased-array wavelength division multiplexer/demultiplexer device.

In FIG. 1 there is shown a passively athermalized optical waveguide circuit 10 employing an optical phased-array comprising a plurality of waveguides 12 formed on a planar substrate 14. As used herein, a passive athermalized optical waveguide circuit refers to a device in which the overall optical characteristics are relatively independent of temperature over a predetermined temperature range, (i.e., the output signals from the device are dependent on the input signals to the device independent of temperature), and in which the athermalization does not require power consumption to control a heating element.

The device illustrated in FIG. 1 is a wavelength division multiplexer and/or demultiplexer including an input waveguide 16, a first slab waveguide or coupler 18, an arrayed waveguide 24 comprising a plurality of curved waveguides 12, a second slab waveguide or coupler 20, and an output waveguide 22.

Figure 2:
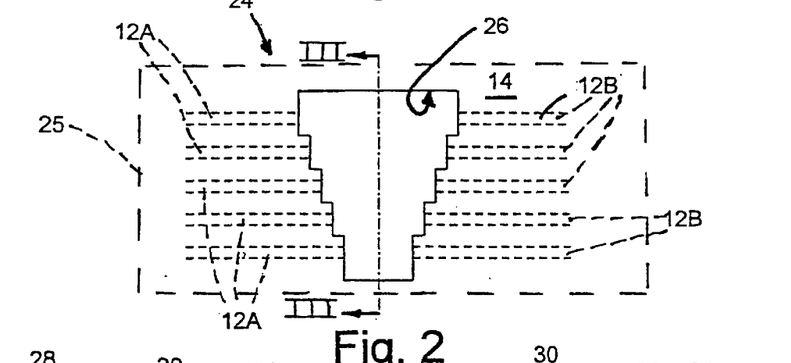
FIG. 2 is a greatly enlarged, schematic top view of a section of the phased-array wavelength division multiplexer/demultiplexer device of FIG. 1 with a triangular groove located in the phased-array.

The array of waveguides 12 between couplers 18 and 20 are arrayed in a curved or generally C-shaped configuration with the individual waveguides spreading apart away from the couplers in order to reduce cross talk. The apex of the curved pattern of waveguides is flat as seen in FIG. 2. Each successive waveguide provides an optical path which is longer than that of its predecessor by a constant amount ΔL.

The plurality of waveguides are in asymmetrical arrangement, with each waveguide comprising three segments including a first segment 12A defined by a silica core, a second segment 12B defined by a silica core, and a third segment 12C defined by a polymer core material. The length of the polymer core segment 12C of each waveguide 12 is selected so that changes in the effective refractive index of the silica segments 12A and 12B of the waveguides as a result of temperature fluctuations is cancelled or balanced by changes in the effective index of refraction of the polymer core section of the waveguide.

For the device shown in FIG. 1, the optical path difference 8 between adjacent waveguide segments 12C in the phased-array 24 is the product of the mean channel wavelength ($\lambda_m$) and the defraction order (m). In the compound waveguide 12 including first and second segments defined by a silica core, and a central polymer segment coupling the first silica core segment with the second silica core segment, the optical path difference between adjacent waveguides 12 is the sum of the products of the effective index of refraction and the refractive index of each of the materials. This relationship is expressed mathematically as follows:

$$\delta = n_s \times \Delta L_s + n_g \times \Delta L_g = ((1-x)n_s + x n_g) \times \Delta L,$$

where $n_s$ is the effective index of refraction of the silica-based waveguide segments 12A and 12B, $n_g$ is the effective index of refraction of the polymer-based waveguide segments 12C, $\Delta L_s$ is the optical path difference between the silica-based segments of adjacent waveguides, and $\Delta L_g$ is the optical path difference of the polymer-based waveguide segments 12C of the adjacent waveguides 12. The overall optical path difference ($\Delta L$) of adjacent waveguides 12 is equal to the sum of the optical path difference between the silica-based segments 12A and 12B of the adjacent waveguides ($\Delta L_s$) and the optical path difference in the polymer-based waveguide segments ($\Delta L_g$) of the adjacent waveguides, and x is the ratio of $\Delta L_g$ to $\Delta L$.

The mean channel wavelength temperature dependence can be determined by differentiating the above equation. Desirably, the effective index of refraction ($n_g$) of the polymer-based segments 12C of waveguides 12 is approximately equal to the effective index of refraction ($n_s$) of the silica-based segments 12A and 12B of the waveguides 12. Differentiating the above equation and using the approximation that $n_g = n_s$, the mean channel wavelength temperature dependence may be expressed as follows:

$$(1/\lambda_m) \times (d\lambda_m/dT) = (1/\delta) \times (d\delta/dT) \approx (1/n_s) \times ((1-x)(dn_s/dT) + x(dn_g/dT)) + \alpha,$$

wherein $\alpha$ is the coefficient of thermal expansion of the substrate 14 (since the length variations along a waveguide are in first approximation imposed by the substrate thermal expansion). The ratio x can be selected to cancel $d\lambda_m/dT$ for each of the waveguides 12.

The waveguides 16 and 22, waveguide segments 12A and 12B, and couplers 18 and 20 typically comprise doped silica patterned on a silicon substrate 14, for example, by photolithographic techniques. As an alternative substrate 14 may be coated with a silica or silicon underclad layer (not shown) and the waveguide cores can be patterned on the underclad. The doped silica is patterned onto substrate 14 or an underclad to form waveguides and couplers which have an index of refraction which is slightly higher than that of substrate 14 or underclad. An overclad, typically a silica glass overclad, is deposited over the doped silica core material patterned on substrate 14. The overclad (not shown in FIG. 1) has an index of refraction which is slightly less than that of the doped silica core material. Preferably, the overclad has properties, especially optical properties such as index of refraction and variation in index of refraction as a function of temperature, which are about the same as those of substrate 14 or the underclad.

An optical waveguide circuit of the type shown in FIG. 1 can be manufactured by forming a plurality of adjacent curved silica waveguide cores 12 of different lengths on a planar substrate 14 using well known techniques. Each of the adjacent waveguide cores has an optical path length difference that is selected to correspond to a channel wavelength. Thereafter, the silica waveguide cores are overcladded with a silica glass overclad. The waveguide cores and overclad define an optical phased-array 24 of waveguides. The foregoing steps, which can be performed using well known techniques, provide a conventional optical device which is highly susceptible to unacceptable variations in optical properties upon exposure to temperature fluctuations within the normal ambient range (e.g., 0° C. to 70° C.). In the present invention however, a generally triangular groove 26 is then etched into a central area of the phased-array of waveguides through the cladding and waveguide core material down to the substrate 14.

Figure 3:
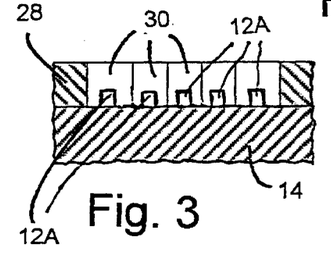
FIG. 3 is a schematic cross-sectional view of the groove in the phased-array shown in FIG. 2, taken along section line III—III of FIG. 2.

In FIG. 2, there is shown an enlarged schematic top view of an area of a phased-array wavelength division multiplexer/demultiplexer device in which a generally triangular groove 26 has been etched. The area illustrated in FIG. 2 roughly corresponds with the area surrounded by dashed line 25 shown in FIG. 1. As indicated in FIG. 2, the generally triangular groove 26 is stepped to provide opposed surfaces which are symmetrically disposed with respect to the line of symmetry of the phased-array of waveguides 12. FIG. 3 is a schematic, partially cross-sectional view of the generally triangular groove 26 as seen along lines III—III of FIG. 2. Groove 26 divides each of the waveguides 12 into the separate segments 12A and 12B, with each of the segments initially being separated by free space after the etching of groove 26.

After the stepped triangular groove 26 has been etched, the uncured polymer waveguide core segments 12C are deposited to bridge the free space between the first and second silica segments 12A and 12B to create a plurality of composite waveguides as described below. The polymer waveguide core segments 12C have an index of refraction which when cured is approximately the same as the index of refraction of silica waveguide core segments 12A and 12B and which is greater than the index of refraction of the underlying substrate and overclad. The polymer waveguide core segments are overcladded to define an optical phased-array comprising a plurality of adjacent waveguides. The lengths of the polymer segments 12C are selected so that the ratio of the optical path differences between each pair of adjacent waveguide cores in the silica segments to the optical path difference between the adjacent waveguide cores in the polymer segments minimizes variation in the overall optical path difference of the adjacent waveguide cores with temperature changes. The polymer waveguide core segments 12C serve two functions. First, the polymer segments 12C have a negative variation of index of refraction as a function of temperature to compensate for the positive variation of the silica waveguide core segments 12A and 12B, thereby maintaining constant channel wavelength independent of temperature. Second, polymer segments 12C guide light signals from silica segments 12A to corresponding silica segments 12B eliminating free propagation of light and reducing loss of signal power.

Figure 4:
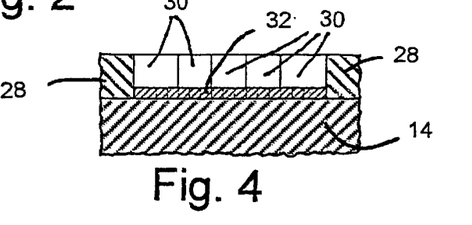
FIG. 4 is a schematic cross-sectional view of the groove in the phased-array shown in FIGS. 2 and 3 with a polymer layer deposited in the groove.
Figure 5:
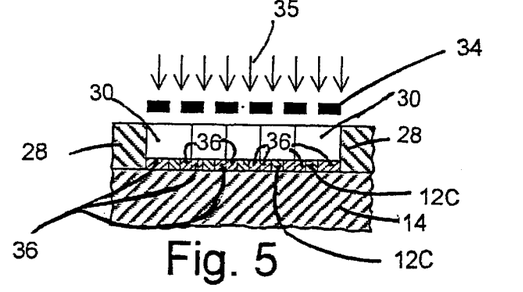
FIG. 5 is a schematic cross-sectional view showing selected portions of the polymer layer shown in FIG. 4 being irradiated to form distinct cross-linked polymer waveguide core segments.
Figure 5A:
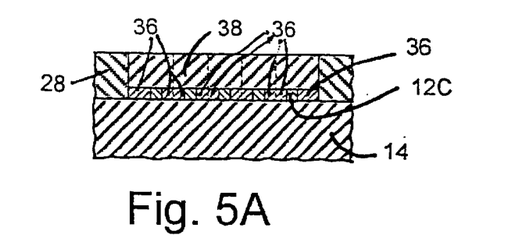
FIG. 5A is a schematic cross-sectional view showing the remainder of the groove above the polymer layer shown in FIG. 5 filled with a glass overclad.

After groove 26 has been etched through cladding 28 to substrate 14, faces 30 (FIG. 3) of cladding 28 and waveguide cores 12A and 12B are exposed. The polymeric sections 12C of the waveguide cores can be prepared using a variety of techniques. In accordance with a first technique, the groove 26 is filled with a polymer layer having the same height as silica cores 12A and 12B. FIG. 4 shows a partial cross-sectional view along section line III—III of FIG. 2 after the groove 26 has been filled with the polymer layer 32 up to the height of the silica core 12A. The polymer sections 12C of the waveguide cores have an index of refraction which is higher than the surrounding cladding. The polymeric sections 12C of the waveguide cores are prepared by irradiating selected portions of polymer layer 32 through a mask 34. Accordingly, polymer layer 32 is a UV curable polymer as described below having an index of refraction which increases with extent of cure. Polymer layer 32 is irradiated with sufficient ultraviolet radiation 35 through mask 34 to form polymer waveguide core segments 12C aligned with and bridging corresponding core segments 12A and 12B. Cores 12C have an index of refraction which is sufficiently higher than the adjacent uncured portions 36 of polymer layer 32 so that light is guided primarily along cores 12C as light traverses the gap between silica waveguide cores 12A and 12B. Thereafter, the remainder of the groove 26 is filled with a silica layer 38 (FIG. 5A). Silica layer 38 is preferably deposited at a low temperature such as by using PECVD, so as to avoid damage to the polymer core segments 12C.

Figure 6:
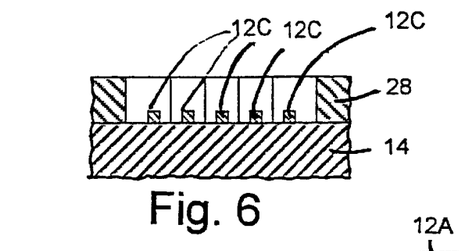
FIG. 6 is a schematic cross-sectional view of the cross-linked polymer waveguide cores formed in a notched-out section of a phased-array of silica waveguides, as shown in FIG. 5, in which the uncured polymer material has been removed.
Figure 7:
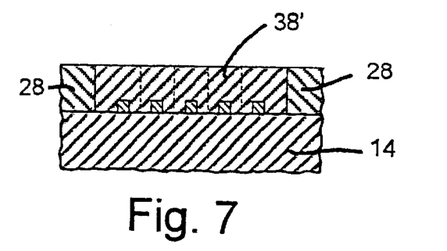
FIG. 7 is a schematic cross-sectional view in which the polymer waveguide core segments shown in FIG. 6 have been overcladded by filling the spaces between the remainder of the groove with silica.
Figure 8:
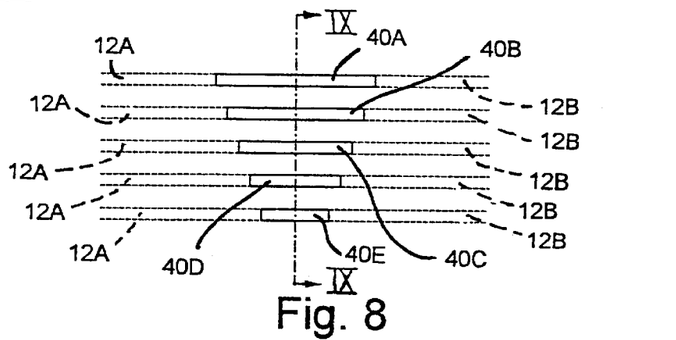
FIG. 8 is a schematic top view of a section of the phased-array shown in FIG. 1, in which a plurality of parallel elongate notches have been etched through silica cladding and silica waveguide cores of the phased-array.
Figure 9:
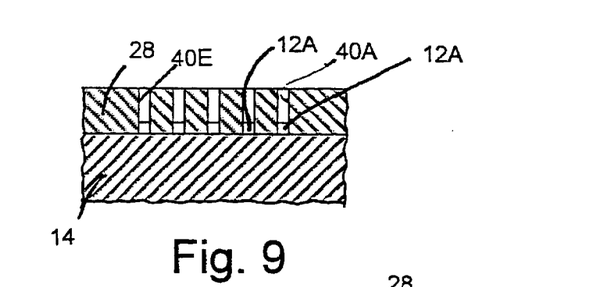
FIG. 9 is a schematic cross-sectional view as seen along lines IX—IX of FIG. 8.
Figure 10:
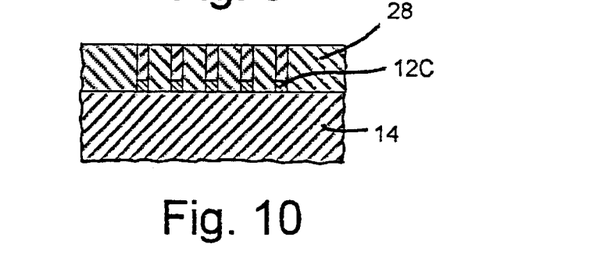
FIG. 10 is a schematic cross-sectional view in which the grooves shown in FIGS. 8 and 9 in which polymer has been deposited to the height of the silica waveguide cores and in which the remaining portion of the grooves have been filled with a silica overclad.

In an alternative manufacturing method, after the polymer waveguide core segments 12C have been formed by UV irradiation through mask 34, uncured portions 36 of polymer layer 32 may be dissolved with a solvent. Suitable solvents include various organic solvents such as aliphatic, cycloaliphatic and aromatic hydrocarbons. FIG. 6 is a partial cross-sectional view showing cured waveguide core segments 12C remaining after uncured portions 36 of polymer layer 32 have been removed by dissolution into a solvent. Thereafter, the remaining portion of the groove 26 is filled with a silica layer 38' as shown in FIG. 7. Silica layer 38' is preferably deposited at a low temperature, such as by using PECVD, to prevent damage to waveguide core segments 12C.

Figure 11:
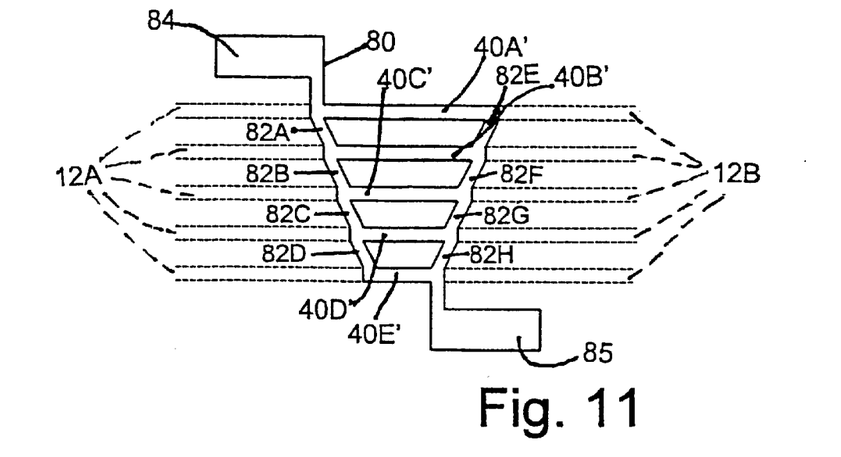
FIG. 11 is a schematic top view of a phased-array section of the device shown in FIG. 1, in which a groove pattern has been etched to facilitate polymer filling of the parallel grooves aligned with the silica waveguides.

FIGS. 8–11 illustrate another alternative process and method for manufacturing polymer waveguide core segments 12C. In this technique, rather than etching a triangle-shaped notch into cladding layer 28, across the entire length of the plurality of adjacent arrayed waveguides, a series of narrow grooves 40A, 40B, 40C, 40D and 40E are etched through cladding 28 and through the existing silica core material down to substrate 14. Thereafter, grooves 40A–40E are filled with a polymer layer of the same thickness as the now defined glass cores 12A and 12B. The polymer material may be deposited into grooves 40A–40E as a molten material which solidifies upon cooling to form polymer waveguide core segments 12C, or polymer cores 12C can be prepared by solvent casting (i.e., dissolving the polymer in a solvent, dispensing the dissolved polymer in grooves 40A–40E, and evaporating the solvent). Polymer waveguide core segments 12C may also be prepared from a UV curable or other cross-linkable resin if desired. FIG. 11 illustrates an alternative embodiment in which a continuous etched pattern or recess 80 is formed in cladding 28 which allows for easier filling of grooves 40A'–40E'. Etched pattern 80 is a lattice work-type pattern which defines generally parallel grooves 40A'–40E' which are generally analogous to grooves 40A–40E shown in FIG. 8. Etched pattern 80 also includes a plurality of connecting 82A–82H which connect opposite ends of adjacent channels or trenches 40A'–40E'. Etched pattern 80 also includes fill reservoirs 84 and 85. The etched lattice work pattern 80 allows polymer to be easily deposited in liquid form into fill reservoirs 84 and/or 85 and flow through channels 82A–82H to fill grooves of troughs 40A'–40E'.

The types of polymers which can be used for forming polymer waveguide core segments 12C include (a) polymers having a glass transition temperature ($T_g$) above 70° C., with a variation in the index of refraction as a function of temperature (dn/dT) on the order of about $-10^{-4}/°$ C. (e.g., from about $-5\times10^{-5}$ to about $-2\times10^{-4}/°$ C.), and (b) polymers with a $T_g$ below 0° C. and with a variation of refractive index as a function of temperature (dn/dT) on the order of about $-3\times10^{-4}/°$ C. (e.g., from about $-1\times10^{-4}$ to about $-6\times10^{-4}$).

Examples of suitable polymers which may be used for preparing polymer waveguide core segments 12C include copolymers containing fluorinated monomers, preferably wherein the fluorinated monomers are selected from vinylic, acrylic, methacrylic and/or allylic monomers. The copolymers prepared from fluorinated monomers are preferably synthesized using a free-radical process (thermally-induced or photo-induced). Examples of suitable polymer materials for preparing polymer waveguide core segments 12C include copolymers made from about 15% to about 70% by weight of pentafluorostyrene and from about 30% to about 85% by weight trifluoroethylmethacrylate.

The polymer material used to prepare polymer waveguide core segments 12C may contain difunctional monomers, such as a difunctional methacrylate-epoxy monomer, e.g., glycidyl methacrylate. The difunctional methacrylate-epoxy monomer facilitates cross-linking of the copolymers. The polymers used to prepare the polymer waveguide core segments 12C may also contain adhesion promoters, such as glycidoxypropyl trimethoxy silane or mercaptopropyl trimethoxy silane.

Figure 12:
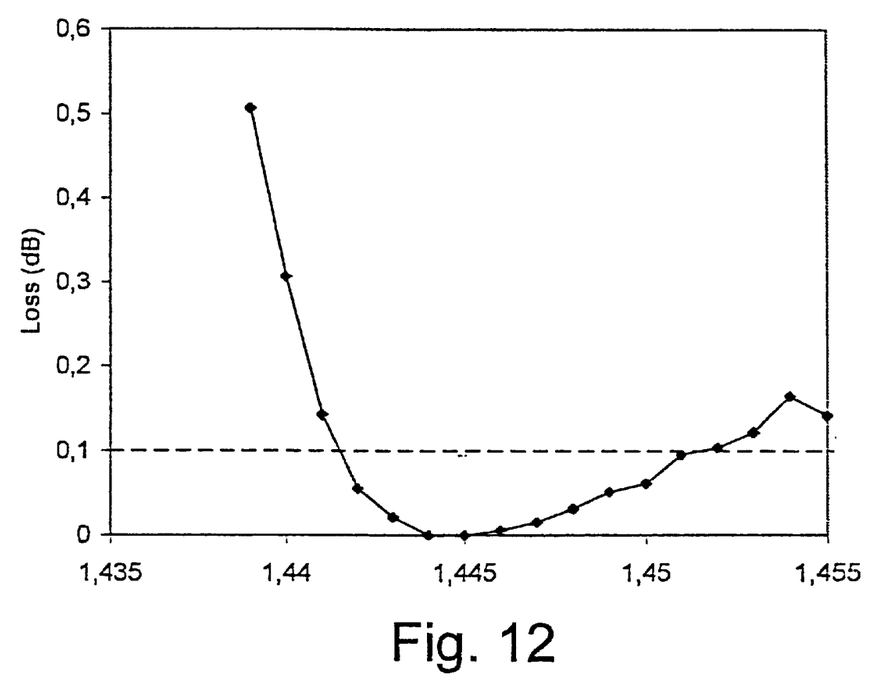
FIG. 12 is a graph of excess signal loss as a function of index of refraction for a composite waveguide having a polymer segment connecting silica segments, as compared to a silica waveguide.

The polymer used to form polymer waveguide core segments 12C are selected to provide an index of refraction which closely matches that of the silica waveguide core segments 12A and 12B. FIG. 12 shows that in order to keep the excess loss below 0.1 dB, the polymer index must be kept within a range of 1.446 plus or minus 0.004 on the operating temperature range. For polymers with dn/dT on the order of $-10^{-4}/°$ C., the index of refraction variation between 0° C. and 70° C. is 0.007. Thus, polymers with a $T_g$ above the operating temperature range can be used to form composite waveguide cores which have a polymer waveguide core segment connecting silica waveguide core segments, and which exhibit low signal power loss.

EXAMPLE 1

UV Irradiation

The first method for creating waveguides within the groove takes advantage of the sensitivity of the polymer index to UV irradiation. In most polymers, UV irradiation at suitable wavelengths induces bond breaking followed by cross-linking, which increases the refractive index. This is the case for the family of copolymers that were formulated for overcladding [1,2]: Table 1 shows the UV-induced index increase for a copolymer of this family (60 wt % pentafluorostyrene, 30 wt % trifluoroethylmethacrylate, and 10 wt % glycidyl methacrylate). The refractive index at 1550 nm was measured with a Metricon prism coupler on a 5 μm thick film on silicon. The sample was submitted to UV irradiation with an H lamp (maximum at 240–320 nm)

delivering an energy of ca. 270 J/cm²/pass. Measurements were performed at several locations of the sample before irradiation, after irradiation (10 and 20 passes), and after 16 hrs in normal conditions.

|  | As deposited | After 10 passes | After 20 passes | 20 passes + 16 hrs |
|---|---|---|---|---|
| N (1550 nm) | 1.4477 | 1.4520 | 1.4552 | 1.4553 |
| Index SD | 0.0001 | 0.0005 | 0.0013 | 0.0009 |

Table 1: Index at 1550 nm for a polymer before and after UV irradiation, and standard deviation for the measurements performed at 10 locations on the sample.

The index increase after twenty passes (+0.008±0.001) is comparable to the index difference between the core and overclad materials in the current planar or lightwave optical circuit (LOC) technology (0.01).

The proposed method for creating waveguides within the groove consists of:
 a) etching a generally triangular groove through overclad waveguides formed on a substrate;
 b) depositing a polymer layer into the groove, of the same thickness as the waveguide core layer;
 c) irradiating the polymer through a mask in order to increase the index of refraction in the continuation of the "input" and "output" waveguides;
 d) filling the groove with material similar to the substrate to overclad the newly created waveguides.

The method involves changing the index of the polymer uniformly through a depth of 6 $\mu$m. The UV light is absorbed uniformly by the polymer, which has a low absorption coefficient. However the absorption coefficient is not too low for the irradiation to be effective in increasing the index.

EXAMPLE 2

Direct Lithography

The second method for creating waveguides within the groove takes advantage of the solubility of the uncrosslinked polymer and of the unsolubility of the crosslinked polymer. A direct lithography process for polymer waveguides can be applied to the groove design as follows:
 a) etching the generally triangular groove through overclad waveguides formed on a substrate;
 b) depositing a polymer layer containing a photosensitive curing agent into the groove, of the same thickness as the core layer, with a refractive index suitable for a core material;
 c) irradiating the polymer through a mask in order to crosslink the unmasked polymer in the continuation of the "input" and "output" waveguides;
 d) dissolving the uncrosslinked polymer;
 e) filling the groove with material similar to the substrate to overclad the newly created waveguides.

EXAMPLE 3

Trenches Inscribed In A Triangular Pattern

The third method for creating temperature compensated waveguides involves etching a groove along each of the waveguides only, as follows:
 a) etching a groove through each waveguide, in alignment with the longitudinal axis of the waveguide to define trenches between "input" and "output" waveguides to sections so formed;
 b) depositing into each of the trenches a polymer having an index of refraction which matches that of the silica waveguide cores or which can be cured to match the index of refraction of the silica waveguide cores, to the height of the silica waveguide cores, and optionally curing the polymer; and
 c) filling the remaining volume of the trenches with an overclad similar to the substrate.

In this way, light is guided in the lateral direction only.

This third method could also be improved by using two different layers of polymer, a core polymer and an overclad polymer, in order to better confine the light.

It will be apparent to those skilled in the art that various modifications and adaptations can be made to the present invention without departing from the spirit and scope of this invention. Thus, it is intended that the present invention cover the modifications and adaptations of this invention, provided they come within the scope of the appended claims and their equivalents.

What is claimed is:

1. A temperature-compensated optical waveguide circuit device comprising:
 a substrate; and
 an optical phased-array having a plurality of curved waveguide cores of different lengths supported on said substrate, wherein pairs of adjacent ones of said plurality of curved waveguide cores have a geometrical path length difference that is selected to correspond to a channel wavelength, wherein each of said plurality of curved waveguide cores includes a first silica segment, a second silica segment, and a central polymer segment coupling said first silica segment with said second silica segment to form a continuous waveguide core, said polymer segment guiding light from the first silica segment to the second silica segment to eliminate free propagation of light and reduce loss of signal power when a light signal is propagated along the waveguide, a ratio of a geometrical path difference between each of said pairs of adjacent ones of said plurality of waveguide cores in said first silica segment and said second silica segment to a geometrical path difference between the adjacent waveguide cores in the polymer segments selected to minimize temperature-induced variations in an overall optical path difference of the waveguide cores.

2. The temperature-compensated optical waveguide circuit device of claim 1 further including an overclad having an index of refraction and encasing the first silica segment, the second silica segment, and the polymer segment of the plurality of curved waveguide cores, the first silica segment, the second silica segment, and the polymer segment each having an index of refraction, wherein an adjacent and underlying portion of the substrate and the overclad each have an index of refraction which is lower than said indices of refraction of the first silica segment, the second silica segment, and the polymer segment of the plurality of curved waveguide cores.

3. The temperature-compensated optical waveguide circuit device of claim 1 wherein the polymer segment of the plurality of waveguide cores are made of a polymer material having a glass transition temperature above 70° C. and a variation in the index of refraction as a function of temperature on the order of $-10^{-4}$/° C.

4. The temperature-compensated optical waveguide circuit device of claim 3 wherein the polymer segment of the plurality of waveguide cores are made of a polymer material having a variation in the index of refraction as a function of temperature of from about $-5\times10^{-5}$ to about $-2\times10^{-4}/°$ C.

5. The temperature-compensated optical waveguide circuit device of claim 1 wherein the polymer segment of the plurality of waveguide cores are made of a polymer material having a glass transition temperature below 0° C. and a variation in the index of refraction as a function of temperature on the order of about $-3\times10^{-4}$ per °C.

6. The temperature-compensated optical waveguide circuit device of claim 5 wherein the polymer segment of the plurality of waveguide cores are made of a polymer material having a variation in the index of refraction as a function of temperature of from about $-10^{-4}$ to about $-6\times10^{-4}$ per °C.

7. The temperature-compensated optical waveguide circuit device of claim 1 wherein the polymer segment of the plurality of waveguide cores are made of a material comprising:
    a copolymer made of fluorinated monomers.

8. The temperature-compensated optical waveguide circuit device of claim 1 wherein the polymer waveguide core segments are made of a material comprising:
    a copolymer of fluorinated vinylic, acrylic, methacrylic, or allylic monomers.

9. The temperature-compensated optical waveguide circuit device of claim 8, wherein the copolymer is made of pentafluorostyrene, trifluoroethylmethacrylate, and glycidyl methacrylate.

10. The temperature-compensated optical waveguide circuit device of claim 9 wherein the copolymer is made from about 15% to about 70% by weight of pentafluorostyrene and from about 85% to about 30% by weight of trifluoroethylmethacrylate.

11. The temperature-compensated optical waveguide circuit device of claim 1 wherein the polymer segment of the plurality of waveguide cores are made of a polymer material comprising:
    a copolymer of fluorinated vinylic, acrylic, methacrylic and/or allylic monomers, and difunctional monomers.

12. The temperature-compensated optical waveguide circuit device of claim 11 wherein the difunctional monomers are methacrylate-epoxy monomers.

13. The temperature-compensated optical waveguide circuit device of claim 12 wherein the polymer material further comprises:
    an adhesion promoter.

14. The temperature-compensated optical waveguide circuit device of claim 13 wherein the adhesion promoter is glycidoxypropyl trimethoxy silane or mercaptopropyl trimethoxy silane.

15. A method for making a temperature-compensated optical waveguide circuit device comprising the steps performed either sequentially or non-sequentially of:
    providing a planar substrate;
    forming a plurality of curved silica waveguide cores of different lengths on said planar substrate, adjacent ones of said plurality of curved silica waveguide cores having a geometrical path length difference that is selected to correspond to a channel wavelength;
    overcladding the plurality of curved silica waveguide cores with a silica overclad, the plurality of curved silica waveguide cores and the silica overclad defining an optical phased-array, said optical phased-array having a central portion;
    forming at least one groove in said central portion of said optical phased-array extending down to said planar substrate to divide each of the plurality of curved silica waveguide cores into a first silica waveguide core segment and a second silica waveguide core segment, each of said first silica waveguide core segment and said second silica waveguide core segment being separated from one another by a free space, said at least one groove having dimensions;
    forming a plurality of polymer waveguide core segments in said at least one groove, each of the plurality of polymer waveguide core segments connecting a one of said first silica waveguide core segments with a corresponding one of said second silica waveguide core segments to form a continuous waveguide core, the polymer waveguide core segment being configured to guide light signals from said first silica waveguide core segments to said second silica waveguide core segment to eliminate free propagation of light and reduce loss of signal power when a light signal is propagated along a waveguide comprising the polymer waveguide core segment;
    overcladding said plurality of polymer waveguide core segments to define a composite optical phased-array including a plurality of adjacent composite waveguides each having a polymer waveguide core segment connecting a first silica waveguide core segment to a second silica waveguide core segment; and
    selecting said dimensions of said at least one groove so that a ratio of a geometrical path difference between adjacent ones of said first silica waveguide core segments to the geometrical path difference between adjacent ones of said plurality of polymer waveguide core segments minimizes temperature-induced variation in an overall optical path difference of adjacent ones of the adjacent composite waveguides.

16. The method of claim 15 wherein the polymer waveguide core segments are made of a polymeric material having a glass transition temperature above 70° C. and a variation in index of refraction as a function of temperature on the order of $-10^{-4}/°$ C.

17. The method of claim 15 wherein the polymer waveguide core segments are made of a polymeric material having a glass transition temperature below 0° C. and a variation in index of refraction as a function of temperature on the order of about $-3\times10^{-4}$ per °C.

18. The method of claim 17 wherein the polymer waveguide core segments are made of a polymeric material having a variation in index of refraction as a function of temperature of from about $10^{-4}$ to about $-6\times10^{-4}$ per °C.

19. The method of claim 15 wherein the polymer waveguide core segments are made of a material comprising:
    a copolymer made of fluorinated monomers.

20. The method of claim 15 wherein the polymer waveguide core segments are made of a material comprising:
    a copolymer of fluorinated vinylic, acrylic, methacrylic or allylic monomers.

21. The method of claim 20, wherein the copolymer is made of pentafluorostyrene, trifluoroethylmethacrylate, and glycidyl methacrylate.

22. The method of claim 21 wherein the copolymer is made from about 15% to about 70% by weight of pentafluorostyrene and from about 85% to about 30% by weight of trifluoroethylmethacrylate.

23. The method of claim 15 wherein the polymer waveguide core segments are made of a polymer material comprising:
  a copolymer of fluorinated vinylic, acrylic, methacrylic or allylic monomers, and difunctional monomers.

24. The method of claim 23 wherein the difunctional monomers are methacrylate-epoxy monomers.

25. The method of claim 15 wherein the plurality of polymer core segments are made from a polymeric material, said polymeric material further comprising:
  an adhesion promoter.

26. The method of claim 25 wherein the adhesion promoter is glycidoxypropyl trimethoxy silane or mercaptopropyl trimethoxy silane.

27. A method for making a temperature-compensated optical waveguide circuit device comprising the steps performed either sequentially or non-sequentially of:
  providing a planar substrate;
  forming a plurality of curved silica waveguide cores of different lengths on said planar substrate, adjacent ones of said plurality of curved silica waveguide cores having a geometrical path length difference that is selected to correspond to a channel wavelength;
  overcladding the plurality of curved silica waveguide cores with a silica overclad, the plurality of curved silica waveguide cores and the silica overclad defining an optical phased-array, said optical phased-array having a central portion;
  forming at least one groove in said central portion of said optical phased-array extending down to said planar substrate to divide each of the plurality of curved silica waveguide cores into a first silica waveguide core segment and a second silica waveguide core segment, each of said first silica waveguide core segment and said second silica waveguide core segment being separated from one another by a free space, said at least one groove having dimensions;
  forming a plurality of polymer waveguide core segments in said at least one groove, each of the plurality of polymer waveguide core segments connecting a one of said first silica waveguide core segments with a corresponding one of said second silica waveguide core segments to form a continuous waveguide core;
  overcladding said plurality of polymer waveguide core segments to define a composite optical phased-array including a plurality of adjacent composite waveguides each having a polymer waveguide core segment connecting a first silica waveguide core segment to a second silica waveguide core segment; and
  selecting said dimensions of said at least one groove so that a ratio of a geometrical path difference between adjacent ones of said first silica waveguide core segments to the geometrical path difference between adjacent ones of said plurality of polymer waveguide core segments minimizes temperature-induced variation in an overall optical path difference of adjacent ones of the adjacent composite waveguides; wherein a single groove is etched in a central area of the optical phased-array, and the plurality of polymer waveguide core segments are formed by depositing a polymeric material into said single groove, and selectively crosslinking portions of said polymeric material to form the polymer waveguide core segments having an index of refraction which is higher than adjacent areas of said polymeric material which have not been crosslinked.

28. The method of claim 27 wherein the waveguide core segments are crosslinked by irradiating the polymeric material with ultraviolet radiation.

29. The method of claim 27 in which the portions of the polymer material which are not crosslinked are removed.

30. The method of claim 29 wherein the polymer waveguide core segments are made of a polymeric material having a variation in the index of refraction as a function of temperature of from about $-5 \times 10^{-5}$ to about $2 \times 10^{-4}$ per °C.

31. A method for making a temperature-compensated optical waveguide circuit device comprising the steps performed either sequentially or non-sequentially of:
  providing a planar substrate;
  forming a plurality of adjacent curved silica waveguide-cores of different lengths on said planar substrate, adjacent ones of said curved silica waveguide cores having a geometrical path length difference that is selected to correspond to a channel wavelength, said plurality of adjacent curved silica waveguide cores each having a longitudinal axis, an index of refraction, and a height;
  overcladding the plurality of adjacent curved silica waveguide cores with a silica overclad, said plurality of adjacent curved silica waveguide cores and said silica overclad defining an optical phased-array,
  forming a plurality of grooves in said phased-array, each of said plurality of grooves extending along a corresponding one of said plurality of adjacent curved silica waveguide cores and generally aligned with said longitudinal axis thereof to define a plurality of trenches disposed between a plurality of input waveguide sections and a plurality of output waveguide sections, each of said plurality of grooves having dimension;
  depositing a polymer into each of said plurality of trenches, said polymer having an index of refraction which either matches or which can be cured to match that of the plurality of adjacent curved silica waveguide cores, said polymer being deposited to said height of said plurality of adjacent curved silica waveguide cores, said polymer deposited in said trenches and said plurality of input waveguide sections and said plurality of output waveguide sections forming a plurality of composite waveguide cores;
  optionally curing said polymer;
  filling a remaining volume of each said plurality of trenches with a silica overclad; and
  selecting said dimensions of said plurality of grooves so that a ratio of a geometrical path difference between each pair of said plurality of adjacent curved silica waveguide cores in said input waveguide sections and said output waveguide sections to a geometrical path difference between the adjacent waveguide cores in said trenches minimizes temperature-induced variation in the overall optical path difference of the plurality of composite waveguide cores.

32. A method for making a temperature-compensated optical waveguide circuit device comprising the steps performed either sequentially or non-sequentially of:
  providing a planar substrate;
  forming a plurality of adjacent curved silica waveguide cores of different lengths on the planar substrate, each of the plurality of adjacent curved silica waveguide cores having a geometrical path length difference that is selected to correspond to a channel wavelength, each of said plurality of adjacent curved silica waveguide cores having a longitudinal axis, a height, and an index of refraction;
  overcladding the plurality of adjacent curved silica waveguide cores with a silica overclad, the plurality of adjacent curved silica waveguide cores and said silica overclad defining an optical phased-array, said phased-array having a central portion;

forming a recessed pattern in said central portion of said optical phased-array extending down to said planar substrate, said recessed pattern defining a groove through each of the plurality of adjacent curved silica waveguide cores generally in alignment with the longitudinal axis thereof to define a plurality of trenches between a plurality of input sections and a plurality of output sections of each of the plurality of adjacent curved silica waveguide cores, a plurality of channels connecting opposite ends of said plurality of adjacent curved silica waveguide cores, and at least one fill reservoir in fluid communication with each of said plurality of trenches;

depositing a polymer into the recessed pattern to said height of said plurality of adjacent curved silica waveguide cores, said polymer having an index of refraction which matches or which can be cured to match that of said plurality of adjacent curved silica waveguide cores;

optionally curing said polymer; and filling a remaining portion of said recessed pattern with a silica overclad.

33. A temperature compensated optical waveguide circuit device comprising:

a substrate;

an optical phased-array comprising a plurality of curved waveguide cores of different lengths supported on said substrate, wherein pairs of adjacent ones of said plurality of curved waveguide cores have a geometrical, path length difference that is selected to correspond to a channel wavelength, wherein each of said plurality of curved waveguide cores includes a first silica segment, a second silica segment, and a central polymer segment coupling the first silica segment with said second silica segment to form a continuous waveguide core, said polymer segment made of a material having a glass transition temperature above 70° C., a ratio of a geometrical path difference between each of said pairs of adjacent ones of said plurality of waveguide cores in said first silica segment and said second silica segment to a geometrical path difference between adjacent waveguide cores in the polymer segments selected to minimize temperature-induced variations in the overall optical path difference of the waveguide cores.

34. A temperature-compensated optical waveguide circuit device comprising:

a substrate; and an optical phased-array having a plurality of curved waveguide cores of different lengths supported on said substrate, wherein pairs of adjacent ones of said plurality of curved waveguide cores have a geometrical path length difference that is selected to correspond to a channel wavelength, wherein each of said plurality of curved waveguide cores includes a first silica segment, a second silica segment, and a central polymer segment coupling said first silica segment with said second silica segment to form a continuous waveguide core, said polymer segment having an index of refraction about equal to the index of refraction of said silica segments, a ratio of a geometrical path difference between each of said pairs of adjacent ones of said plurality of waveguide cores in said first silica segment and said second silica segment to a geometrical path difference between the adjacent waveguide cores in the polymer segments selected to minimize temperature-induced variations in an overall optical path difference of the waveguide cores.

35. A temperature-compensated optical waveguide circuit device comprising:

a substrate; and an optical phased-array having a plurality of curved waveguide cores of different lengths supported on said substrate, wherein pairs of adjacent ones of said plurality of curved waveguide cores have a geometrical path length difference that is selected to correspond to a channel wavelength, wherein each of said plurality of curved waveguide cores includes a first silica segment, a second silica segment, and a central polymer segment coupling said first silica segment with said second silica segment to form a continuous waveguide core, a polymer cladding adjacent said polymer segment, said polymer cladding having an index of refraction that is sufficiently lower than the index of refraction of the polymer segment whereby light is guided primarily along said polymer segment when light is propagated along a waveguide comprising said polymer segment, a ratio of a geometrical path difference between each of said pairs of adjacent ones of said plurality of waveguide cores in said first silica segment and said second silica segment to a geometrical path difference between the adjacent waveguide cores in the polymer segments selected to minimize temperature-induced variations in an overall optical path difference of the waveguide cores.

* * * * *

UNITED STATES PATENT AND TRADEMARK OFFICE
CERTIFICATE OF CORRECTION

PATENT NO.    : 6,574,409 B1                                        Page 1 of 1
DATED         : June 3, 2003
INVENTOR(S)   : Marc Moroni et al.

It is certified that error appears in the above-identified patent and that said Letters Patent is hereby corrected as shown below:

Column 4,
Line 39, after "segments" insert -- such as in FIG. 5A --.
Line 52, "device independent" should be -- device and independent --.
Line 56, after "including" insert -- at least --.
Line 59, after "and" insert -- at least --.
Line 66, "an optical" should be -- a geometrical --.

Column 5,
Line 13, "8" should be -- $\delta$ --.
Line 13, "waveguide segments 12C" should be -- waveguides 12 --.
Line 15, "defraction" should be -- diffraction --.
Lines 20 and 21, "refraction index of each of the materials" should be
-- geometrical path length difference of each of the segments --.
Lines 29, 31, 33, 34 and 36, "optical" should be -- geometrical --.

Column 9,
Line 23, after "overclad" insert -- and --.

Signed and Sealed this

Seventh Day of October, 2003

JAMES E. ROGAN
*Director of the United States Patent and Trademark Office*